United States Patent [19]

Bantjes et al.

[11] Patent Number: 4,879,380

[45] Date of Patent: Nov. 7, 1989

[54] PROCESS FOR CONDITIONING CRUDE POLYHALOGENATED PIGMENTS USING A HETEROCYCLIC ORGANIC SOLVENT

[75] Inventors: John Henry Bantjes; Thomas Edward both of Holland, Mich.

[73] Assignee: BASF Corp., Parsippany, N.J.

[21] Appl. No.: 190,457

[22] Filed: May 5, 1988

[51] Int. Cl.$^4$ ............................................. C09B 47/00
[52] U.S. Cl. .................... 540/137; 540/136; 540/138; 540/141
[58] Field of Search ............... 540/136, 137, 138, 141

[56] References Cited

U.S. PATENT DOCUMENTS

| | | | |
|---|---|---|---|
| 2,982,666 | 5/1961 | Chun et al. | 106/308 |
| 3,127,412 | 3/1964 | Gaertner | 260/314.5 |
| 3,758,320 | 9/1973 | Flores | 106/288 Q |
| 3,801,591 | 4/1974 | Jackson | 260/314.5 |
| 3,849,150 | 11/1974 | Schrempp et al. | 106/288 Q |
| 4,020,088 | 4/1977 | Wessling | 260/314.5 |
| 4,056,534 | 11/1977 | Schiessler et al. | 260/314.5 |
| 4,257,951 | 3/1981 | Matrick | 260/314.5 |
| 4,439,238 | 3/1984 | Pigasse | 106/20 |
| 4,451,654 | 5/1984 | Graser et al. | 546/34 |

*Primary Examiner*—Richard L. Raymond
*Attorney, Agent, or Firm*—Rupert B. Hurley, Jr.

[57] ABSTRACT

A polyhalogenated pigment crude is combined with a heterocyclic organic liquid in which the pigment is only "slightly stable", and the resulting mixture is mixed under high shear conditions to produce a pigmentary product.

11 Claims, No Drawings

PROCESS FOR CONDITIONING CRUDE POLYHALOGENATED PIGMENTS USING A HETEROCYCLIC ORGANIC SOLVENT

FIELD OF THE INVENTION

The present invention pertains to a process for conditioning a crude polyhalogenated pigment. The pigment is selected from the group consisting of phthalocyanines perylenes, quinacridones, and irgazines. The process involves combining the pigment crude with a heterocyclic organic solvent in which the pigment is only slightly soluble, followed by subjecting the mixture to high shear.

DESCRIPTION OF THE PRIOR ART

The following U.S. Patents are the closest related art known to the inventors of the present process: U.S. Pat. Nos. 4,056,534; 3,127,412; 2,982,666; 4,451,654; 4,439,238; 4,257,951; 4,020,088; 3,849,150; 3,801,591; 3,758,320. Each of these patents is discussed briefly below.

U.S. Pat. No. 4,056,534 describes a process for making a highly pure, unsubstituted α-copper phthalocyanine. The process is carried out by first forming an aqueous suspension of phalocyanine by regeneration from its sulfate (requiring the use of relatively large quantities of concentrated sulfuric acid). The resulting crystals are then ground in a ball mill in the presence of water. An organic compound is then added to the resulting aqueous suspension of phthalocyanine pigment, followed by stirring and heating for several hours. Among the organic liquids used in the examples in the '534 patent are: isopropanol, acetone, dimethylformamide, and pyridine. Among the organic compounds mentioned are cycloaliphatic or heterocyclic organic compounds (column 1, lines 42-55).

U.S. Pat. No. 3,127,412 describes a process for conditioning phthalocyanine pigments by grinding the pigment crude in the presence of a solid organic compound (which may be an aliphatic or aromatic hydrocarbon), termed a "carrier". In addition to the carrier, there may be other "additions" present, such as alcohols, ketones (e.g. see cyclohexane in column 2, line 49) or even pyridine (column 2, line 54). However, none of the 30 examples given utilize any "additions". Furthermore, column 2, lines 57-60, state that "The quantities of the additions must be so controlled that the insolubility of the carrier in the grinding medium is substantially unaffected".

U.S. Pat. No. 2,982,666 describes a method of making a high strength pigment from a pigment crude by mixing the pigment crude with a liquid organic conditioning agent (a polyol) which has "no solvent action whatsoever" (column 2, line 36) on the pigment. The mixture of pigment crude and conditioning agent are then ground under severe grinding conditions.

U.S. Pat. No. 4,451,654 describes a process of conditioning crude phthalocyanine pigments (among other) by recrystalizing the pigment in a hot organic liquid selected from certain $C_3$-$C_5$ aliphatic compounds. The process described in the '654 patent does not involve grinding a mixture of the pigment crude and organic liquid, but rather grinds the pigment crude before mixing the ground crude with the organic liquid. After a mixture of the ground pigment crude and organic liquid are formed, the mixture is heated and stirred during recrystalization.

U.S. Pat. No. 4,439,238 describes a process for preparing a phthalocyanine pigment from a phthalocyanine pigment crude by grinding the crude in combination with a fatty amine which may have an alicyclic group thereon. In addition, the grinding may use both an amine and one or more solvents such as "methanol, ethanol, propanol, isopropanol, butanol, isobutanol, pyridine, dimethylformamide and dimethylsulfoxide" (column 2, line 68, to column 3, line 2). However, the '238 patent also states that "the solvent content is between 1 and 10 percent by weight relative to pure copper phthalocyanine, but preferably 2 to 5 percent by weight; the overall content of amine plus solvent must not exceed 15 percent by weight" (column 3, lines 3-6).

U.S. Pat. No. 4,257,951 describes a process for preparing pigmentary copper phthalocyanine from phthalocyanine pigment crude. The process involves milling the crude phthalocyanine in the presence of a small amount (0.6 to 3.7 cc per 100 grams of copper phthalocyanine) of an organic solvent and in the presence of aluminum sulfate. The '951 patent lists among the several organic liquids useful in the process: xylene, tetrachloroethylene, perchloroethylene, p- and o-dichlorobenzene, nitrobenzene, trichlorethylene, benzonitrile, carbon tetrachloride, trichlorobenzene, and ethylene dichloride.

U.S. Pat. No. 4,020,088 describes a process for preparing a perhalogenocopper phthalocyanine by introducing a phthalocyanine crude into an aromatic solvent in which is suspended a long-chain alcohol-sulphate. The '088 patent suggests as suitable solvents: benzene, toluene, xylene, monochlorobenzene, dichlorobenzene, trichlorobenzene, and nitrobenzene.

U.S. Pat. No. 3,849,150 describes a process in which a phthalocyanine pigment crude is combined with an organic solvent (or solvent mixture) and is then mixed or kneaded at an elevated temperature. The solvents suggested in the '150 patent include: benzene, toluene, ethylbenzene, xylenes, chlorobenzene, gasoline fractions, mineral oil fractions, chlorinated aliphatic hydrocarbons, aliphatic and aromatic alcohols, alkyl substituted phenols and napthols, ketones such as acetone, methyl ethyl ketone, methyl isobutyl ketone, acetophenone, cyclohexanone, esters of organic acids, etc. The mixing or kneading apparati given in the examples of the '150 patent include ball mills, stirrers, kneaders and ball mills with stirring means.

U.S. Pat. No. 3,801,591 describes a process for conditioning crude phthalocyanines by dissolving the phthalocyanine crude in concentrated sulfuric acid and then precipitating phthalocyanine crystals, following which the filterability of the resulting crystals is improved by subjecting the crystals to intense, low shear agitation to produce a foam. The aqueous suspension of pigment may be rendered more foamable by the addition of foamable organic liquids such as phenols, napthols, benzoic acid, perchloroethylene, hexane, orthodichlorobenzene, and surfactants (e.g. p-toluene sulfonic acid).

U.S. Pat. No. 3,758,320 describes a process for conditioning phthalocyanine pigments by mixing the pigment with a breaching agent (a phenol) followed by agitating the mixture of pigment crude and breaching agent in a high speed mixer, Waring blender, Kady mill, or high shear mill.

BRIEF SUMMARY OF THE INVENTION

The present invention provides a method for conditioning crude polyhalogenated pigments selected from the group consisting of phthalocyanines, perylenes, irgazines, and quinacridones. The process is carried out in two steps. In the first step, the polyhalogenated pigment crude is combined with a heterocyclic organic liquid in which the pigment has a solubility between 1 part in $10^3$ and 1 part in $10^6$. The ratio of the pigment to the organic liquid is between 1.5:1 and 3.5:1, on a weight basis. A mixture is formed by the combination of the pigment crude and the organic liquid.

In the second step, the mixture (formed above) is mixed under high shear conditions so that polyhalogenated pigment crystals are produced.

As can be noted from the above description, the process of the invention requires no inorganic salts or strong acids. Since the process of the invention utilizes only a small amount of the organic solvent (which is recoverable), the process produces virtually no environmental impact. Furthermore, the process permits a high loading of crude in the mixer, enabling larger production batches. A third advantage is that the mixing cycle time is very short (less than 5 hours) in comparison with conventional salt grinding (from 8 to 16 hours).

DETAILED DESCRIPTION OF THE PREFERRED EMBODIMENTS

The process of the present invention involves combining a pigment crude selected from the group consisting of polyhalogenated phthalocyanines, perylenes, quinacridones, and irgazines with a heterocyclic organic liquid in which the pigment has a solubility of at least 1 part in $10^6$ but less than 1 part in $10^3$. The resulting mixture is then subjected to high shear conditions so that a high strength pigment product is produced.

Although the invention is useful for producing polyhalogenated phthalocyanines, perylenes, irgazines, and quinacridones, it is most preferred to carry out the process on phthalocyanine pigments. Any polyhalogenated phthalocyanine may be used, such as copper, tin, vanadium, cobalt, aluminum, zinc, etc. Furthermore, any halogen atom may be used (florine, chlorine, bromine, etc). However, copper is the preferred metal and chlorine is the preferred halogen. Most preferably the polychlorinated copper phthalocyanine has at least 13 chlorine atoms per molecule. The pigment crude may be produced by any method, as the process of the invention is independent of the manner in which the pigment crude is synthesized.

The organic liquid with which the pigment is mixed must be a heterocyclic liquid within which the pigment has a solubility of greater than 1 part in $10^6$ but less than 1 part in $10^3$. A solubility of less than 1 part in $10$ is herein considered as substantially insoluble. A solubility of between 1 part in $10^3$ and 1 part in $10^6$ is necessary in the process of the present invention because this "slight solubility" serves to dissolve particles which are so small that they lack color value due to the fact that they scatter light. The small particles are eliminated while the larger particles, which have color value, remain substantially the same in size. Organic liquids known to be useful in the process of the present invention include quinoline, pyridine, morpholine, quinazoline, pyrrolidine, pyrrolidone, piperidine, pyrimidine, pyrazoline, quinoxaline and isoquinoline. Quinoline is the most preferred of these liquids, for safety reasons. Of course, any other heterocyclic organic liquid which meets the solubility criteria above will be operable in the present invention.

The ratio of pigment to organic liquid may range from 1:1 to 3.5:1, on a weight basis. Preferably, the ratio of pigment to organic liquid is from 1.5:1 to 3:1. Most preferably the ratio of pigment to organic liquid in approximately 2:1.

It is preferred that there are no substantial quantities of water present during the mixing process. The presence of water causes the pigment and organic liquid to form a discontinuous phase during the mixing process, an undesirable effect.

The organic liquid must be in the liquid phase during the mixing process. However, the mixing process may be carried out at temperatures higher than room temperatures e.g. from 20° to 100° C.). Thus the heterocyclic organic compound making up the organic "liquid" may actually be a solid at room temperature, so long as the mixing step of the process is carried out at a temperature high enough that the organic compound is a liquid. Of course, the temperature should not be so high that either the pigment or the organic compound degrades.

The mixing step must be preformed by a high shear mixer. Since the combination of the organic liquid and the pigment crude (in the ratio ranges described above) form a highly viscous mass, the mixer should not use media, as the media are rendered ineffective upon being taken up into the viscous mass. For this reason, media mills are incapable of producing the high shear needed in the process of the present invention. Rather, the high shear mixer should be a sigma mixer or any other high intensity, high shear mixer similar to a sigma blade mixer but having blades which are other than sigmoidal. The mixing step should be carried out for a time period which produces a pigment of maximum strength. Usually, maximum strength will be obtaned somewhere within a grinding time of 15 minutes and three hours. As can be seen in the Example following, maximum pigment strength was measured after two hours of grinding.

EXAMPLE 1

250 Grams of polychlorinated copper phthalocyanine pigment crude were added to a sigma blade mixer. The mixer was then turned on, and during agitation of the pigment crude, 125 grams of quinoline were added. Agitation was continued after the quinoline was added, and the resulting mixture was heated to 75° to 80° C. Agitation was continued and the temperature was maintained at 75° to 80° C. for five hours. During each hour of this period, a 30 gram sample was taken for analysis. These samples were evaluated in an oil ink, and analyzed by comparison with a commercially available phthalocyanine green. The results are given in Table I, immediately below.

TABLE I

| Agitation Time (Hours) | Color Development +H blue −Yellow | Strength (Parts) |
|---|---|---|
| 1 | −1.5 | 99 |
| 2 | −1.5 | 98 |
| 3 | −1.6 | 104 |
| 5 | −1.9 | 110 |

As can be seen in Table I, the agitation of the crude copper phthalocyanine in quinoline quickly produced a high strength phthalocyanine green pigment which was yellow in hue. Table I also indicates that maximum pigment strength is produced, generally, within two hours or less, and thereafter pigment strength diminishes. After maximum strength is obtained, further grinding is detrimental (as Table I illustrates).

The embodiments of the invention in which an exclusive privilege or property is claimed are defined as follows:

1. A process for conditioning crude polyhalogenated phthalocyanine pigments, the process comprising:
   (a) combining the polyhalogenated phthalocyanine pigment crude with a heterocyclic organic liquid in which the pigment has a solubility of between 1 part in $10^3$ and 1 part in $10^6$, the ratio of pigment to organic liquid being between 1.5:1 and 3.5:1 on a weight basis, whereby a mixture is formed; and
   (b) mixing the mixture under high shear conditions so that polyhalogenated phthalocyanine pigment crystals are produced.

2. A process as described in claim 1 wherein the heterocyclic organic liquid is a member selected from the group consisting of pyridine, morpholine, isoquinoline, quinazoline, pyrrolidine, pyrrolidone, piperidine, pyrimidine, pyrazoline, and quinoxaline.

3. A method as described in claim 1 wherein the ratio of pigment to organic liquid is between 1.5:1 and 3:1, on a weight basis.

4. A method as described in claim 1 wherein the high shear conditions are produced by a sigma blade mixture.

5. A method as described in claim 1 wherein the ratio of pigment to organic liquid is approximately 2:1, on a weight basis.

6. A method as described in claim 1 wherein the mixing is carried out at a temperature between 20° C. and 100° C.

7. A method as described in claim 2 wherein the heterocyclic organic liquid is quinoline.

8. A method as described in claim 2 wherein the mixing under high shear conditions is carried out for a period between 15 minutes and 3 hours.

9. A method as described in claim 2 wherein the mixing under high shear conditions is carried out for a period of approximately 2 hours.

10. A method as described in claim 1 wherein the pigment is a polychlorinated phthalocyanine pigment.

11. A method as described in claim 10 wherein the pigment is a polychlorinated phthalocyanine pigment having at least 13 chlorine atoms per molecule.

* * * * *